USO09911286B2

United States Patent
Ryan et al.

(10) Patent No.: US 9,911,286 B2
(45) Date of Patent: Mar. 6, 2018

(54) ELECTRONIC GAMING DEVICE WHICH DETERMINES PLAY INFORMATION

(71) Applicant: IGT, Las Vegas, NV (US)

(72) Inventors: Chad A. Ryan, Henderson, NV (US); Sam Johnson, Las Vegas, NV (US); Zaki Khal, Las Vegas, NV (US)

(73) Assignee: IGT, Las Vegas, NV (US)

( * ) Notice: Subject to any disclaimer, the term of this patent is extended or adjusted under 35 U.S.C. 154(b) by 157 days.

(21) Appl. No.: 14/864,232

(22) Filed: Sep. 24, 2015

(65) Prior Publication Data

US 2016/0055724 A1    Feb. 25, 2016

Related U.S. Application Data

(63) Continuation of application No. 14/802,296, filed on Nov. 18, 2013, now Pat. No. 9,144,743, which is a continuation of application No. 11/847,062, filed on Aug. 29, 2007, now Pat. No. 8,585,479, which is a continuation-in-part of application No. 11/468,946, filed on Aug. 31, 2006, now Pat. No. 9,564,004, which is a continuation-in-part of application No. 10/689,407, filed on Oct. 20, 2003, now Pat. No. 7,335,106.

(51) Int. Cl.
*A63F 13/00* (2014.01)
*G07F 17/32* (2006.01)
*A63F 13/30* (2014.01)

(52) U.S. Cl.
CPC .......... *G07F 17/3295* (2013.01); *A63F 13/12* (2013.01); *G07F 17/3225* (2013.01); *G07F 17/3237* (2013.01)

(58) Field of Classification Search
None
See application file for complete search history.

(56) References Cited

U.S. PATENT DOCUMENTS

| | | | |
|---|---|---|---|
| 2,205,471 | A | 6/1940 | Fagerholm |
| 2,474,573 | A | 6/1949 | Cohen |
| 2,743,108 | A | 4/1956 | Sanders |
| 2,812,182 | A | 11/1957 | Fiorino |
| 2,842,368 | A | 7/1958 | Williams |
| 3,505,646 | A | 4/1970 | Affel, Jr. et al. |
| 3,549,150 | A | 12/1970 | Weeks |
| 3,655,199 | A | 4/1972 | Ohki |
| D228,142 | S | 8/1973 | Mannina |

(Continued)

FOREIGN PATENT DOCUMENTS

| | | |
|---|---|---|
| GB | 2083936 | 3/1982 |
| GB | 2098778 | 11/1985 |

(Continued)

*Primary Examiner* — Sunit Pandya
(74) *Attorney, Agent, or Firm* — Neal, Gerber & Eisenberg LLP

(57) ABSTRACT

A video output signal analyzes that analyzes a video output signal to determine game play information. In video poker, card values and player strategies can be determined based on a "reverse encoding" of the video signal to determine the original video bitmap. The bitmap can then be analyzed to determine what is taking place during a game, without having to receive this information directly from the processing unit that is actually implementing the game.

16 Claims, 6 Drawing Sheets

(56) References Cited

U.S. PATENT DOCUMENTS

| | | |
|---|---|---|
| 3,843,133 A | 10/1974 | Brown |
| 3,853,324 A | 12/1974 | Reiner et al. |
| 3,877,700 A | 4/1975 | Moe |
| 3,923,305 A | 12/1975 | Reiner et al. |
| 4,012,046 A | 3/1977 | Liket |
| 4,015,850 A | 4/1977 | Russell |
| 4,033,588 A | 7/1977 | Watts |
| 4,066,264 A | 1/1978 | Rowman |
| 4,093,215 A | 6/1978 | Ballard |
| 4,126,851 A | 11/1978 | Okor |
| 4,129,304 A | 12/1978 | Mager |
| 4,149,727 A | 4/1979 | Penney |
| 4,193,598 A | 3/1980 | Freese |
| 4,198,052 A | 4/1980 | Gauselmann |
| 4,218,063 A | 8/1980 | Cooper et al. |
| 4,247,106 A | 1/1981 | Jeffers et al. |
| 4,322,612 A | 3/1982 | Lange |
| 4,335,809 A | 6/1982 | Wain |
| 4,339,798 A | 7/1982 | Hedges et al. |
| 4,359,227 A | 11/1982 | Porciello |
| 4,363,485 A | 12/1982 | Edwall |
| 4,372,558 A | 2/1983 | Shimamoto et al. |
| 4,389,048 A | 6/1983 | Burgess |
| 4,443,012 A | 4/1984 | Makovic et al. |
| 4,448,419 A | 5/1984 | Telnaes |
| 4,467,424 A | 8/1984 | Hedges et al. |
| 4,494,197 A | 1/1985 | Troy et al. |
| 4,506,890 A | 3/1985 | Murry |
| 4,517,656 A | 5/1985 | Solimeno et al. |
| 4,550,916 A | 11/1985 | Ortiz |
| 4,564,923 A | 1/1986 | Nakano |
| 4,570,930 A | 2/1986 | Matheson |
| 4,572,509 A | 2/1986 | Sitrick |
| 4,573,681 A | 3/1986 | Okada |
| 4,582,324 A | 4/1986 | Koza et al. |
| 4,586,707 A | 5/1986 | McNeight et al. |
| 4,593,904 A | 6/1986 | Graves |
| 4,614,342 A | 9/1986 | Takashima |
| 4,615,527 A | 10/1986 | Moss |
| 4,618,150 A | 10/1986 | Kimura |
| 4,624,459 A | 11/1986 | Kaufman |
| 4,636,174 A | 1/1987 | Andersen et al. |
| 4,648,602 A | 3/1987 | Maroney |
| 4,652,998 A | 3/1987 | Koza et al. |
| 4,657,256 A | 4/1987 | Okada |
| 4,666,160 A | 5/1987 | Hamilton |
| 4,695,053 A | 9/1987 | Vazquez, Jr. et al. |
| 4,720,108 A | 1/1988 | Gramera |
| 4,752,068 A | 6/1988 | Endo |
| 4,756,532 A | 7/1988 | Kamille |
| 4,760,527 A | 7/1988 | Sidley |
| 4,773,647 A | 9/1988 | Okada et al. |
| 4,781,377 A | 11/1988 | McVean et al. |
| 4,805,907 A | 2/1989 | Hagiwara |
| 4,834,386 A | 5/1989 | Rosenthal et al. |
| 4,836,546 A | 6/1989 | DiRe et al. |
| 4,836,553 A | 6/1989 | Suttle et al. |
| 4,837,728 A | 6/1989 | Barrie et al. |
| 4,861,041 A | 8/1989 | Jones et al. |
| 4,926,327 A | 5/1990 | Sidley |
| 4,936,588 A | 6/1990 | Rader et al. |
| 4,948,133 A | 8/1990 | Helm et al. |
| 4,961,581 A | 10/1990 | Barnes et al. |
| 4,964,642 A | 10/1990 | Kamille |
| 4,986,546 A | 1/1991 | Cerulla |
| 4,995,615 A | 2/1991 | Cheng |
| 5,001,632 A | 3/1991 | Hall-Tipping |
| 5,031,914 A | 7/1991 | Rosenthal |
| 5,043,889 A | 8/1991 | Lucey |
| 5,083,271 A | 1/1992 | Thacher et al. |
| 5,083,800 A | 1/1992 | Lockton |
| 5,102,134 A | 4/1992 | Smyth |
| 5,112,050 A | 5/1992 | Koza et al. |
| 5,114,155 A | 5/1992 | Tillery et al. |
| 5,116,055 A | 5/1992 | Tracy |
| 5,129,652 A | 7/1992 | Wilkinson |
| 5,130,794 A | 7/1992 | Ritchey |
| 5,152,529 A | 10/1992 | Okada |
| 5,193,815 A | 3/1993 | Pollard |
| 5,205,555 A | 4/1993 | Hamano |
| 5,221,083 A | 6/1993 | Dote |
| 5,280,909 A | 1/1994 | Tracy |
| 5,286,036 A | 2/1994 | Barabash |
| 5,290,033 A | 3/1994 | Bittner et al. |
| 5,299,810 A | 4/1994 | Pierce et al. |
| 5,301,952 A | 4/1994 | Fitzgerald |
| 5,308,065 A | 5/1994 | Bridgeman et al. |
| 5,324,041 A | 6/1994 | Boylan et al. |
| 5,340,317 A | 8/1994 | Freeman |
| 5,342,047 A | 8/1994 | Heidel et al. |
| 5,342,049 A | 8/1994 | Wichinsky et al. |
| 5,342,058 A | 8/1994 | Giovannetti |
| 5,344,144 A | 9/1994 | Cannon |
| 5,356,140 A | 10/1994 | Dabrowski et al. |
| 5,374,060 A | 12/1994 | Goldberg |
| 5,380,008 A | 1/1995 | Mathis et al. |
| 5,393,061 A | 2/1995 | Manship et al. |
| 5,393,067 A | 2/1995 | Paulsen et al. |
| 5,397,125 A | 3/1995 | Adams |
| 5,401,024 A | 3/1995 | Simunek |
| 5,409,225 A | 4/1995 | Kelly et al. |
| 5,411,260 A | 5/1995 | Smith |
| 5,411,268 A | 5/1995 | Nelson et al. |
| 5,411,271 A | 5/1995 | Mirando |
| 5,417,424 A | 5/1995 | Snowden et al. |
| 5,429,361 A | 7/1995 | Raven et al. |
| 5,449,173 A | 9/1995 | Thomas et al. |
| 5,462,277 A | 10/1995 | Takemoto |
| 5,472,195 A | 12/1995 | Takemoto et al. |
| 5,482,289 A | 1/1996 | Weingardt |
| 5,489,096 A | 2/1996 | Aron |
| 5,531,440 A | 7/1996 | Babrowski et al. |
| 5,536,016 A | 7/1996 | Thompson |
| 5,542,669 A | 8/1996 | Charron et al. |
| 5,544,892 A | 8/1996 | Breeding |
| 5,560,603 A | 10/1996 | Seelig et al. |
| 5,560,610 A | 10/1996 | Behm et al. |
| 5,564,700 A | 10/1996 | Celona |
| 5,564,977 A | 10/1996 | Algie |
| 5,593,349 A | 1/1997 | Miguel et al. |
| 5,611,535 A | 3/1997 | Tiberio |
| 5,611,730 A | 3/1997 | Weiss |
| 5,613,679 A | 3/1997 | Casa et al. |
| 5,618,045 A | 4/1997 | Kagan et al. |
| 5,624,119 A | 4/1997 | Leake |
| 5,628,684 A | 5/1997 | Bouedec |
| 5,643,088 A | 7/1997 | Vaughn et al. |
| 5,645,281 A | 7/1997 | Hesse et al. |
| 5,645,486 A | 7/1997 | Nagao et al. |
| 5,647,798 A | 7/1997 | Falciglia |
| 5,649,704 A | 7/1997 | Dobbin |
| 5,664,998 A | 9/1997 | Seelig et al. |
| 5,667,217 A | 9/1997 | Kelly et al. |
| 5,669,817 A | 9/1997 | Tarantino |
| 5,671,921 A | 9/1997 | Seelig et al. |
| 5,676,371 A | 10/1997 | Kelly et al. |
| 5,697,611 A | 12/1997 | Kelly et al. |
| 5,697,843 A | 12/1997 | Manship et al. |
| 5,700,007 A | 12/1997 | Kelly et al. |
| 5,700,008 A | 12/1997 | Lawlor et al. |
| 5,704,612 A | 1/1998 | Kelly et al. |
| 5,707,285 A | 1/1998 | Place et al. |
| 5,707,286 A | 1/1998 | Carlson |
| 5,718,429 A | 2/1998 | Keller, Jr. |
| 5,722,891 A | 3/1998 | Inoue |
| 5,727,786 A | 3/1998 | Weingardt |
| 5,732,948 A | 3/1998 | Yoseloff |
| 5,733,193 A | 3/1998 | Allard et al. |
| 5,743,523 A | 4/1998 | Kelly et al. |
| 5,743,532 A | 4/1998 | Lafferty |
| 5,755,621 A | 5/1998 | Marks et al. |
| 5,766,074 A | 6/1998 | Cannon et al. |
| 5,768,382 A | 6/1998 | Schneier et al. |
| 5,769,424 A | 6/1998 | Kelly et al. |

(56) References Cited

U.S. PATENT DOCUMENTS

| | | |
|---|---|---|
| 5,769,716 A | 6/1998 | Saffari et al. |
| 5,772,509 A | 6/1998 | Weiss |
| 5,772,510 A | 6/1998 | Roberts |
| 5,779,544 A | 7/1998 | Seelig et al. |
| 5,779,549 A | 7/1998 | Walker et al. |
| 5,788,240 A | 8/1998 | Feinberg |
| 5,788,573 A | 8/1998 | Baerlocher et al. |
| 5,803,451 A | 9/1998 | Kelly et al. |
| 5,803,914 A | 9/1998 | Ryals et al. |
| 5,810,354 A | 9/1998 | Banyai |
| 5,816,915 A | 10/1998 | Kadlic |
| 5,816,918 A | 10/1998 | Kelly et al. |
| 5,823,874 A | 10/1998 | Adams |
| 5,823,875 A | 10/1998 | Tarantino |
| 5,833,536 A | 11/1998 | Davids et al. |
| 5,833,537 A | 11/1998 | Barrie |
| 5,833,538 A | 11/1998 | Weiss |
| 5,836,586 A | 11/1998 | Marks et al. |
| 5,836,819 A | 11/1998 | Ugawa |
| 5,839,960 A | 11/1998 | Parra et al. |
| 5,848,932 A | 12/1998 | Adams |
| 5,851,148 A | 12/1998 | Brune et al. |
| 5,855,514 A | 1/1999 | Kamille |
| 5,860,648 A | 1/1999 | Petermeier et al. |
| 5,868,618 A | 2/1999 | Netley et al. |
| 5,871,398 A | 2/1999 | Schneier et al. |
| 5,873,781 A | 2/1999 | Keane |
| 5,876,284 A | 3/1999 | Acres et al. |
| 5,882,258 A | 3/1999 | Kelly et al. |
| 5,882,261 A | 3/1999 | Adams |
| 5,885,157 A | 3/1999 | Harada et al. |
| 5,888,115 A | 3/1999 | Shoemaker, Jr. et al. |
| 5,890,963 A | 4/1999 | Yen |
| 5,902,184 A | 5/1999 | Bennett et al. |
| 5,909,875 A | 6/1999 | Weingardt |
| 5,910,046 A | 6/1999 | Wada et al. |
| 5,911,418 A | 6/1999 | Adams |
| 5,919,088 A | 7/1999 | Weiss |
| 5,938,196 A | 8/1999 | Antoja |
| 5,941,770 A | 8/1999 | Miers et al. |
| 5,951,397 A | 9/1999 | Dickinson |
| 5,964,463 A | 10/1999 | Moore, Jr. |
| 5,967,514 A | 10/1999 | Kelly et al. |
| 5,980,384 A | 11/1999 | Barrie |
| 5,984,779 A | 11/1999 | Bridgeman et al. |
| 5,988,638 A | 11/1999 | Rodesch et al. |
| 5,988,643 A | 11/1999 | Awada |
| 5,993,315 A | 11/1999 | Strider et al. |
| 5,997,401 A | 12/1999 | Crawford |
| 6,004,207 A | 12/1999 | Wilson, Jr. et al. |
| 6,007,426 A | 12/1999 | Kelly et al. |
| 6,012,722 A | 1/2000 | Petermeier et al. |
| 6,012,982 A | 1/2000 | Piechowiak et al. |
| 6,015,344 A | 1/2000 | Kelly et al. |
| 6,015,346 A | 1/2000 | Bennett |
| 6,019,369 A | 2/2000 | Nakagawa et al. |
| 6,019,374 A | 2/2000 | Breeding |
| 6,024,641 A | 2/2000 | Sarno |
| 6,033,307 A | 3/2000 | Vancura |
| 6,047,963 A | 4/2000 | Pierce et al. |
| 6,048,271 A | 4/2000 | Barcelou |
| 6,050,895 A | 4/2000 | Luciano, Jr. et al. |
| 6,056,642 A | 5/2000 | Bennett |
| 6,062,979 A | 5/2000 | Inoue |
| 6,062,981 A | 5/2000 | Luciano, Jr. et al. |
| 6,068,552 A | 5/2000 | Walker et al. |
| 6,071,192 A | 6/2000 | Weiss |
| 6,089,976 A | 7/2000 | Schneider et al. |
| 6,089,977 A | 7/2000 | Bennett |
| 6,089,978 A | 7/2000 | Adams |
| 6,089,980 A | 7/2000 | Gauselmann |
| 6,102,400 A | 8/2000 | Scott et al. |
| 6,102,402 A | 8/2000 | Scott et al. |
| 6,102,798 A | 8/2000 | Bennett |
| 6,110,039 A | 8/2000 | Oh |
| 6,110,041 A | 8/2000 | Walker et al. |
| 6,110,043 A | 8/2000 | Olsen |
| 6,113,492 A | 9/2000 | Walker et al. |
| 6,117,007 A | 9/2000 | Matsuyama et al. |
| 6,117,008 A | 9/2000 | Machiguchi |
| 6,120,031 A | 9/2000 | Adams |
| 6,120,377 A | 9/2000 | McGinnis, Sr. et al. |
| 6,120,378 A | 9/2000 | Moody et al. |
| 6,123,333 A | 9/2000 | McGinnis, Sr. et al. |
| 6,126,541 A | 10/2000 | Fuchs |
| 6,126,542 A | 10/2000 | Fier |
| 6,126,547 A | 10/2000 | Ishimoto |
| 6,135,453 A | 10/2000 | Srichayaporn |
| 6,135,884 A | 10/2000 | Hedrick et al. |
| 6,135,885 A | 10/2000 | Lermusiaux |
| 6,139,013 A | 10/2000 | Pierce et al. |
| 6,142,873 A | 11/2000 | Weiss et al. |
| 6,142,874 A | 11/2000 | Kodachi et al. |
| 6,146,273 A | 11/2000 | Olsen |
| 6,149,156 A | 11/2000 | Feola |
| 6,159,095 A | 12/2000 | Frohm et al. |
| 6,159,097 A | 12/2000 | Gura |
| 6,159,098 A | 12/2000 | Slomiany et al. |
| 6,165,070 A | 12/2000 | Nolte et al. |
| 6,173,955 B1 | 1/2001 | Perrie et al. |
| 6,174,235 B1 | 1/2001 | Walker et al. |
| 6,174,237 B1 | 1/2001 | Stephenson |
| 6,176,781 B1 | 1/2001 | Walker et al. |
| 6,183,361 B1 | 2/2001 | Cummings et al. |
| 6,190,255 B1 | 2/2001 | Thomas et al. |
| 6,193,606 B1 | 2/2001 | Walker et al. |
| 6,210,275 B1 | 4/2001 | Olsen |
| 6,210,279 B1 | 4/2001 | Dickinson |
| 6,213,876 B1 | 4/2001 | Moore, Jr. |
| 6,217,448 B1 | 4/2001 | Olsen |
| 6,220,593 B1 | 4/2001 | Pierce et al. |
| 6,220,961 B1 | 4/2001 | Keane et al. |
| 6,224,482 B1 | 5/2001 | Bennett |
| 6,224,483 B1 | 5/2001 | Mayeroff |
| 6,224,484 B1 | 5/2001 | Okuda et al. |
| 6,224,486 B1 | 5/2001 | Walker et al. |
| 6,227,971 B1 | 5/2001 | Weiss |
| 6,231,442 B1 | 5/2001 | Mayeroff |
| 6,231,445 B1 | 5/2001 | Acres |
| 6,234,897 B1 | 5/2001 | Frohm et al. |
| 6,238,288 B1 | 5/2001 | Walker et al. |
| 6,251,013 B1 | 6/2001 | Bennett |
| 6,261,177 B1 | 7/2001 | Bennett |
| 6,262,694 B1 | 7/2001 | Ishimoto et al. |
| 6,267,669 B1 | 7/2001 | Luciano et al. |
| 6,270,409 B1 | 8/2001 | Shuster |
| 6,270,411 B1 | 8/2001 | Gura et al. |
| 6,279,910 B1 | 8/2001 | De Keller |
| 6,286,834 B1 | 9/2001 | Caputo |
| 6,287,194 B1 | 9/2001 | Okada et al. |
| 6,290,600 B1 | 9/2001 | Glasson |
| 6,290,603 B1 | 9/2001 | Luciano, Jr. |
| 6,293,866 B1 | 9/2001 | Walker et al. |
| 6,302,790 B1 | 10/2001 | Brossard |
| 6,305,686 B1 | 10/2001 | Perrie et al. |
| 6,309,298 B1 | 10/2001 | Gerou |
| 6,309,299 B1 | 10/2001 | Weiss |
| 6,309,300 B1 | 10/2001 | Glavich |
| 6,311,976 B1 | 11/2001 | Yoseloff et al. |
| 6,312,331 B1 | 11/2001 | Yoseloff |
| 6,315,291 B1 | 11/2001 | Moody |
| 6,315,660 B1 | 11/2001 | Demar et al. |
| 6,322,309 B1 | 11/2001 | Thomas et al. |
| 6,328,649 B1 | 12/2001 | Randall et al. |
| 6,334,814 B1 | 1/2002 | Adams |
| 6,346,043 B1 | 2/2002 | Colin et al. |
| 6,347,996 B1 | 2/2002 | Gilmore et al. |
| 6,364,313 B1 | 4/2002 | Moody |
| 6,364,765 B1 | 4/2002 | Walker et al. |
| 6,364,766 B1 | 4/2002 | Anderson et al. |
| 6,364,768 B1 | 4/2002 | Acres et al. |
| 6,368,212 B1 | 4/2002 | Moody |
| 6,368,214 B1 | 4/2002 | Luciano |
| 6,375,187 B1 | 4/2002 | Baerlocher |

(56) References Cited

U.S. PATENT DOCUMENTS

| | | |
|---|---|---|
| 6,379,245 B2 | 4/2002 | De Keller |
| 6,386,974 B1 | 5/2002 | Adams |
| 6,390,473 B1 | 5/2002 | Vancura et al. |
| 6,394,899 B1 | 5/2002 | Walker |
| 6,398,218 B1 | 6/2002 | Vancura |
| 6,398,219 B1 | 6/2002 | Pierce et al. |
| 6,406,369 B1 | 6/2002 | Baerlocher et al. |
| 6,413,160 B1 | 7/2002 | Vancura |
| 6,413,161 B1 | 7/2002 | Baerlocher et al. |
| 6,419,577 B1 | 7/2002 | Okada et al. |
| 6,428,412 B1 | 8/2002 | Anderson et al. |
| 6,435,511 B1 | 8/2002 | Vancura et al. |
| 6,443,837 B1 | 9/2002 | Jaffe et al. |
| 6,454,651 B1 | 9/2002 | Yoseloff |
| 6,461,241 B1 | 10/2002 | Webb et al. |
| 6,467,771 B1 | 10/2002 | deKeller |
| 6,471,208 B2 | 10/2002 | Yoseloff et al. |
| 6,488,580 B1 | 12/2002 | Robb |
| 6,497,408 B1 | 12/2002 | Walker |
| 6,506,118 B1 | 1/2003 | Baerlocher et al. |
| 6,517,433 B2 | 2/2003 | Loose et al. |
| 6,522,312 B2 | 2/2003 | Ohshima et al. |
| 6,537,150 B1 | 3/2003 | Luciano et al. |
| 6,554,703 B1 | 4/2003 | Bussick et al. |
| 6,554,704 B2 | 4/2003 | Nicastro et al. |
| 6,565,434 B1 | 5/2003 | Acres |
| 6,569,015 B1 | 5/2003 | Baerlocher et al. |
| 6,572,473 B1 | 6/2003 | Baerlocher |
| 6,582,306 B1 | 6/2003 | Kaminkow |
| 6,585,588 B2 | 7/2003 | Hartl |
| 6,592,457 B1 | 7/2003 | Frohm et al. |
| 6,599,193 B2 | 7/2003 | Baerlocher et al. |
| 6,602,137 B2 | 8/2003 | Kaminkow et al. |
| 6,605,001 B1 | 8/2003 | Tarantino |
| 6,605,002 B2 | 8/2003 | Baerlocher |
| 6,607,437 B2 | 8/2003 | Casey et al. |
| 6,607,438 B2 | 8/2003 | Baerlocher et al. |
| 6,612,575 B1 | 9/2003 | Cole et al. |
| 6,626,758 B1 | 9/2003 | Parham et al. |
| 6,632,140 B2 | 10/2003 | Berman et al. |
| 6,632,141 B2 | 10/2003 | Webb et al. |
| 6,645,071 B2 | 11/2003 | Perrie et al. |
| 6,645,074 B2 | 11/2003 | Thomas et al. |
| 6,645,075 B1 | 11/2003 | Gatto et al. |
| 6,648,754 B2 | 11/2003 | Baerlocher et al. |
| 6,651,252 B1 | 11/2003 | Gordon et al. |
| 6,656,040 B1 | 12/2003 | Brosnan et al. |
| 6,661,425 B1 | 12/2003 | Hiroaki |
| 6,666,765 B2 | 12/2003 | Vancura |
| 6,669,559 B1 | 12/2003 | Baerlocher et al. |
| 6,676,521 B1 | 1/2004 | La Mura et al. |
| 6,682,419 B2 | 1/2004 | Webb et al. |
| 6,682,420 B2 | 1/2004 | Webb et al. |
| 6,682,561 B2 | 2/2004 | Anderson et al. |
| 6,692,003 B2 | 2/2004 | Potter et al. |
| 6,709,331 B2 | 3/2004 | Berman |
| 6,709,332 B2 | 3/2004 | Adams |
| 6,722,976 B2 | 4/2004 | Adams |
| 6,733,386 B2 | 5/2004 | Cuddy et al. |
| 6,733,389 B2 | 5/2004 | Webb et al. |
| 6,746,016 B2 | 6/2004 | Perrie et al. |
| 6,752,717 B2 | 6/2004 | Vancura |
| 6,761,632 B2 | 7/2004 | Bansemer et al. |
| 6,767,284 B1 | 7/2004 | Koza |
| 6,769,983 B2 | 8/2004 | Slomiany |
| 6,769,986 B2 | 8/2004 | Vancura |
| 6,780,103 B2 | 8/2004 | Bansemer et al. |
| 6,780,111 B2 | 8/2004 | Cannon et al. |
| 6,786,824 B2 | 9/2004 | Cannon |
| 6,800,027 B2 | 10/2004 | Giobbi et al. |
| 6,811,482 B2 | 11/2004 | Letovsky |
| 6,811,486 B1 | 11/2004 | Luciano, Jr. |
| 6,817,948 B2 | 11/2004 | Pascal et al. |
| 6,832,959 B2 | 12/2004 | Baerlocher |
| 6,837,793 B2 | 1/2005 | McClintic |
| 6,851,674 B2 | 2/2005 | Pierce et al. |
| 6,852,027 B2 | 2/2005 | Kaminkow et al. |
| 6,863,606 B1 | 3/2005 | Berg et al. |
| 6,896,261 B2 | 5/2005 | Pierce et al. |
| 6,923,720 B2 | 8/2005 | Loose |
| 6,942,568 B2 | 9/2005 | Baerlocher |
| RE38,812 E | 10/2005 | Acres et al. |
| 6,981,917 B2 | 1/2006 | Webb et al. |
| 6,984,174 B2 | 1/2006 | Cannon et al. |
| 6,988,732 B2 | 1/2006 | Vancura |
| 7,052,011 B2 | 5/2006 | Pierce et al. |
| 7,073,793 B2 | 7/2006 | Vancura |
| 7,077,744 B2 | 7/2006 | Cannon |
| 7,156,735 B2 | 1/2007 | Brosnan et al. |
| 7,160,187 B2 | 1/2007 | Loose et al. |
| 7,169,041 B2 | 1/2007 | Tessmer et al. |
| 7,169,046 B2 | 1/2007 | Webb et al. |
| 7,175,521 B2 | 2/2007 | McClintic |
| 7,182,690 B2 | 2/2007 | Giobbi et al. |
| 7,192,344 B2 | 3/2007 | Baerlocher |
| 7,217,187 B2 | 5/2007 | Vancura |
| 7,234,700 B2 | 6/2007 | Vancura |
| 7,247,096 B2 | 7/2007 | Vancura |
| 7,284,756 B2 | 10/2007 | Pierce et al. |
| 7,326,115 B2 | 2/2008 | Baerlocher |
| 7,329,181 B2 | 2/2008 | Hoshino et al. |
| 7,357,714 B2 | 4/2008 | Tessmer et al. |
| 7,488,252 B2 | 2/2009 | Griswold et al. |
| 7,505,519 B2 | 3/2009 | Gordon et al. |
| 7,572,182 B2 | 8/2009 | Vancura |
| 7,597,618 B2 | 10/2009 | Webb et al. |
| 7,704,136 B2 | 4/2010 | Shackleford et al. |
| 7,753,773 B2 | 7/2010 | Baerlocher et al. |
| 7,841,944 B2 | 11/2010 | Wells |
| 7,857,696 B2 | 12/2010 | Tarantino |
| 8,032,906 B2 | 10/2011 | Gordon et al. |
| 8,047,908 B2 | 11/2011 | Walker et al. |
| 8,142,273 B2 | 3/2012 | Williams et al. |
| 8,192,281 B2 | 6/2012 | Williams et al. |
| 8,199,068 B2 | 6/2012 | Williams et al. |
| 8,210,922 B2 | 7/2012 | Williams et al. |
| 8,272,958 B2 | 9/2012 | Smith et al. |
| 8,398,475 B2 | 3/2013 | De Waal |
| 8,425,318 B2 | 4/2013 | Canterbury et al. |
| 8,677,420 B2 | 3/2014 | Cromarty et al. |
| 8,784,196 B2 | 7/2014 | Little et al. |
| 2001/0040343 A1 | 11/2001 | Falciglia, Sr. |
| 2002/0025845 A1 | 2/2002 | Cannon |
| 2002/0039923 A1 | 4/2002 | Cannon et al. |
| 2002/0049084 A1 | 4/2002 | Hughs-Baird et al. |
| 2002/0059252 A1 | 5/2002 | Yamaguchi |
| 2002/0077173 A1 | 6/2002 | Luciano et al. |
| 2002/0103029 A1 | 8/2002 | Finlayson et al. |
| 2002/0107065 A1 | 8/2002 | Rowe |
| 2002/0123376 A1 | 9/2002 | Walker et al. |
| 2002/0128055 A1 | 9/2002 | Adams |
| 2002/0151342 A1 | 10/2002 | Tracy et al. |
| 2002/0151360 A1 | 10/2002 | Durham et al. |
| 2002/0160825 A1 | 10/2002 | Nicastro et al. |
| 2002/0193099 A1 | 12/2002 | Paulsen |
| 2003/0013519 A1 | 1/2003 | Bennett |
| 2003/0064773 A1 | 4/2003 | Baerlocher et al. |
| 2003/0100361 A1 | 5/2003 | Sharpless et al. |
| 2003/0104854 A1 | 6/2003 | Cannon |
| 2003/0104860 A1 | 6/2003 | Cannon et al. |
| 2003/0114209 A1 | 6/2003 | Ritner, Jr. et al. |
| 2003/0114218 A1 | 6/2003 | McClintic |
| 2003/0114219 A1 | 6/2003 | McClintic |
| 2003/0114220 A1 | 6/2003 | McClintic |
| 2003/0119576 A1 | 6/2003 | McClintic et al. |
| 2003/0119581 A1 | 6/2003 | Cannon et al. |
| 2003/0125102 A1 | 7/2003 | Cannon |
| 2003/0125107 A1 | 7/2003 | Cannon |
| 2003/0157980 A1 | 8/2003 | Loose et al. |
| 2003/0171144 A1 | 9/2003 | Letovsky |
| 2003/0199306 A1 | 10/2003 | Parker |
| 2003/0211881 A1 | 11/2003 | Walker et al. |
| 2003/0216168 A1 | 11/2003 | Cannon et al. |
| 2004/0048659 A1 | 3/2004 | Seelig et al. |

(56) References Cited

U.S. PATENT DOCUMENTS

| | | |
|---|---|---|
| 2004/0106446 A1 | 6/2004 | Cannon et al. |
| 2004/0116173 A1 | 6/2004 | Baerlocher |
| 2004/0116174 A1 | 6/2004 | Baerlocher et al. |
| 2004/0135316 A1 | 7/2004 | Lipscomb |
| 2004/0171415 A1 | 9/2004 | Webb et al. |
| 2004/0176157 A1 | 9/2004 | Walker et al. |
| 2004/0198490 A1 | 10/2004 | Bansemer et al. |
| 2004/0204226 A1 | 10/2004 | Foster et al. |
| 2004/0254005 A1* | 12/2004 | Shackleford ............ G07F 17/32 463/13 |
| 2004/0266515 A1 | 12/2004 | Gauselmann |
| 2005/0020340 A1 | 1/2005 | Cannon |
| 2005/0026664 A1 | 2/2005 | Bansemer et al. |
| 2005/0140088 A1 | 6/2005 | Randall |
| 2005/0164762 A1 | 7/2005 | Smith et al. |
| 2005/0170883 A1* | 8/2005 | Muskin ................... G07F 7/025 463/25 |
| 2005/0181853 A1 | 8/2005 | Baerlocher |
| 2005/0239546 A1 | 10/2005 | Hedrick et al. |
| 2005/0255912 A1 | 11/2005 | Love et al. |
| 2006/0009286 A1 | 1/2006 | Durham et al. |
| 2006/0040735 A1 | 2/2006 | Baerlocher |
| 2006/0063583 A1 | 3/2006 | Thomas |
| 2006/0105836 A1 | 5/2006 | Walker et al. |
| 2006/0121972 A1 | 6/2006 | Walker et al. |
| 2006/0135248 A1 | 6/2006 | Anderson et al. |
| 2006/0166731 A1 | 7/2006 | Yoshimi et al. |
| 2006/0189382 A1 | 8/2006 | Muir et al. |
| 2006/0211475 A1 | 9/2006 | Walker et al. |
| 2006/0211478 A1 | 9/2006 | Walker et al. |
| 2006/0247012 A1 | 11/2006 | Walker et al. |
| 2007/0004513 A1 | 1/2007 | Wells et al. |
| 2007/0010318 A1 | 1/2007 | Rigsby et al. |
| 2007/0026922 A1 | 2/2007 | Lindo et al. |
| 2007/0099688 A1 | 5/2007 | Brosnan et al. |
| 2007/0218997 A1 | 9/2007 | Cho |
| 2008/0004104 A1 | 1/2008 | Durham et al. |
| 2008/0108406 A1 | 5/2008 | Oberberger |
| 2008/0108425 A1 | 5/2008 | Oberberger |
| 2008/0113755 A1 | 5/2008 | Rasmussen et al. |
| 2008/0119283 A1 | 5/2008 | Baerlocher |
| 2008/0136741 A1 | 6/2008 | Williams et al. |
| 2008/0171593 A1 | 7/2008 | Haga et al. |
| 2008/0220849 A1 | 9/2008 | Wadleigh et al. |
| 2008/0220874 A1 | 9/2008 | Tatsumi et al. |
| 2008/0311980 A1 | 12/2008 | Cannon |
| 2009/0029758 A1 | 1/2009 | Young |
| 2009/0061991 A1 | 3/2009 | Popovich et al. |
| 2009/0061997 A1 | 3/2009 | Popovich et al. |
| 2009/0061998 A1 | 3/2009 | Popovich et al. |
| 2009/0061999 A1 | 3/2009 | Popovich et al. |
| 2009/0075721 A1 | 3/2009 | Pacey et al. |
| 2009/0104968 A1 | 4/2009 | Englman et al. |
| 2009/0149253 A1 | 6/2009 | Kelly et al. |
| 2009/0233705 A1 | 9/2009 | LeMay et al. |
| 2010/0137047 A1 | 6/2010 | Englman et al. |
| 2010/0227691 A1 | 9/2010 | Karsten |
| 2010/0234089 A1 | 9/2010 | Saffari et al. |
| 2010/0234091 A1 | 9/2010 | Baerlocher et al. |
| 2011/0053676 A1 | 3/2011 | Wolf et al. |
| 2011/0118011 A1 | 5/2011 | Filipour et al. |
| 2011/0310159 A1 | 12/2011 | Suzuki et al. |

FOREIGN PATENT DOCUMENTS

| | | |
|---|---|---|
| GB | 2190227 | 11/1987 |
| GB | 2205188 | 11/1988 |
| GB | 2253299 | 9/1992 |
| JP | 07-275507 | 10/1995 |
| JP | 2000-024320 | 1/2000 |
| JP | 2001-000749 | 1/2001 |
| WO | WO/98/51384 | 11/1998 |
| WO | WO/2001/003786 | 1/2001 |
| WO | WO/2003/027970 | 4/2003 |

* cited by examiner

ELECTRONIC GAMING DEVICE WHICH DETERMINES PLAY INFORMATION

PRIORITY CLAIM

This application is a continuation of, claims priority to and the benefit of U.S. patent application Ser. No. 14/082,296, filed on Nov. 18, 2013, which is a continuation of, claims priority to and the benefit of U.S. patent application Ser. No. 11/847,062, filed on Aug. 29, 2007, now U.S. Pat. No. 8,585,479, which is a continuation-in-part of, claims priority to and the benefit of U.S. patent application Ser. No. 11/468,946, filed on Aug. 31, 2006, which is a continuation-in-part of, claims priority to and the benefit of U.S. patent application Ser. No. 10/689,407, filed on Oct. 20, 2003, now U.S. Pat. No. 7,335,106, the entire contents of each are incorporated by reference herein.

BACKGROUND OF THE INVENTION

1. Field of the Invention

The present invention relates to a system to decode video signal output on an Electronic Gaming Device (EGD) and determine player actions which can then be transmitted to a casino database for promotional and other use.

2. Description of the Related Art

Video poker is a popular form of wagering in a casino. In a standard game of video poker, a player is dealt five cards, the player can indicate which cards the player wishes to discard, upon which the player can press a draw button and the discarded cards can then be replaced. Video poker machines can transmit to a casino host a result of each game which includes how much the player has won or lost on each game.

The current infrastructure may not provide an easy way for an EGD to transmit a video poker player's decisions. For example, a player may choose to select to hold certain cards but the EGD may be designed to only transmit to a casino database certain limited information. However, other systems may be configured to provide further information regarding the player actions, cards dealt, cards held etc.

For years the casino industry has been faced with a dichotomy; slot players are rated on a real time actual basis while table games players are rated on an estimated basis. Part of the problem for casinos is that in blackjack in particular, player decisions may significantly affect the expected win for a casino. Likewise with video poker, player decisions have a significant impact on casino win. However, present systems may not be capable of accounting for the impact of player decisions in video poker. The result is that casinos only realize very late in their relationship with a customer that their play varies substantially from what it should be. Present systems typically utilize an average theoretical win per hand for video poker players as opposed to trying to accurately gauge the true value of a video poker player.

It would be desirable if the EGD could transmit to the casino database information about what decisions the player has made. Certain players may be more desirable to the casino than other players based on their decisions. By not transmitting such information, the casino is missing out on relevant information. For systems that do transmit detailed play information, it is desirable for a system that collects, analyzes and processes the received information.

SUMMARY OF THE INVENTION

In general, the present invention includes a system and method to decode a video signal output from an EGD and displayed on an output device. The video signal can then be analyzed to determine information about what has taken place during a game. The information can then be transmitted to a casino database in order that the casino database can tabulate and store the relevant information so it can be used at a later time.

In one embodiment of the present invention, the decoded video includes standard video signals that are transmitted to or sent to the gaming device or the video display. In another embodiment of the present invention, the video content can be slightly modified to embed information, such as through the creation of a covert channel. In yet another embodiment of the invention, the items displayed can be watermarked and the content displayed can be verified by reading the embedded watermarks.

DESCRIPTION OF THE DRAWINGS

Various aspects, features and advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

The present invention is directed to a video signal analyzer which can receive a video signal of an electronic gaming device (EGD) that is transmitted to an output device (such as a CRT or touch screen display). The analyzer does not interfere with the output signal and the EGD plays normally. The analyzer analyzes the video signal to decipher what is going on during play of the EGD and can extract useful information from the output signal. The useful information can then be transmitted to a casino database so that the casino can store this information for later use for marketing, promotional, or other purposes.

Figure 1:
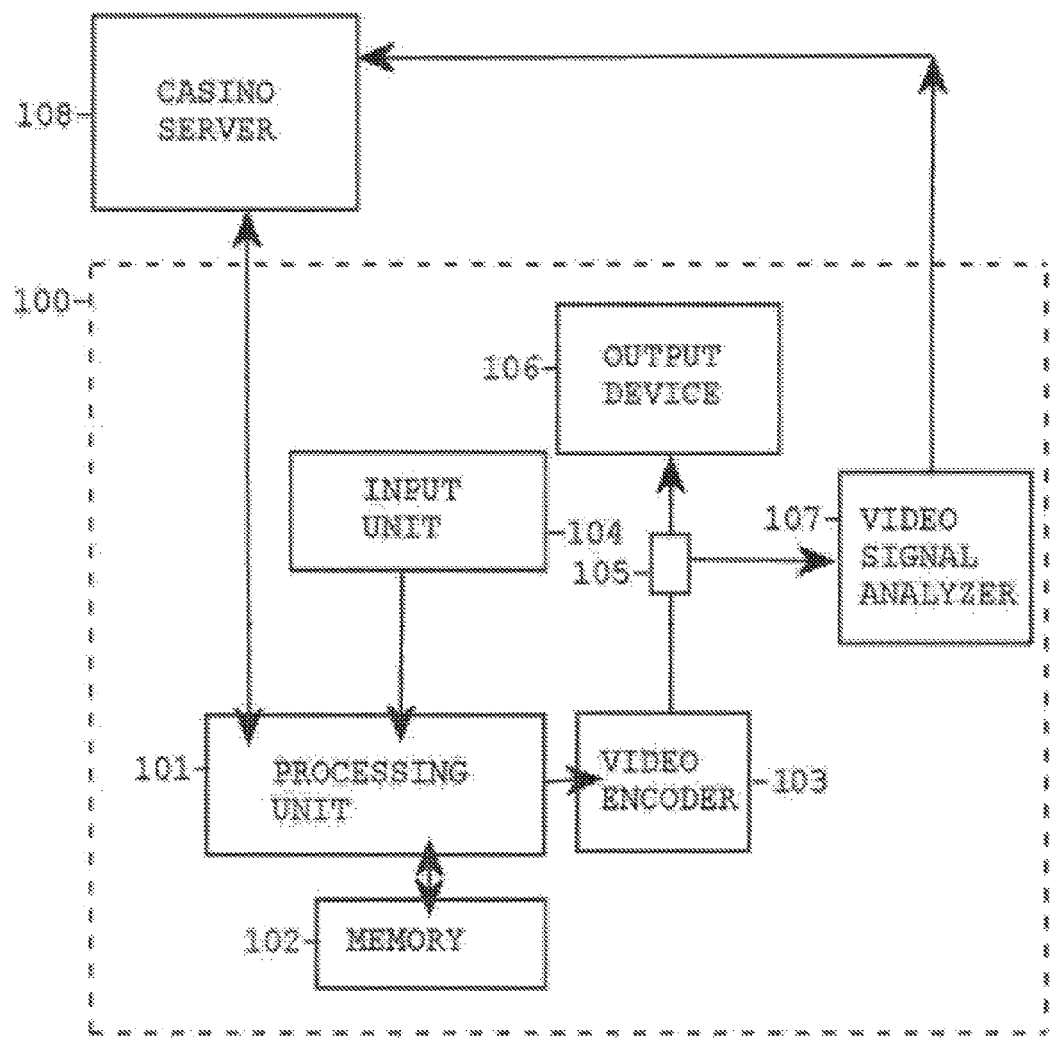
FIG. 1 is a schematic block diagram illustrating an EGD with a video signal analyzer.

FIG. 1 is a system diagram illustrating an EGD with a video signal analyzer. An EGD 100 can comprise a processing unit 101 which contains a processor, cache, and other components to drive a wagering game such as video poker (or other games such as slot machines). A memory 102 is connected to the processing unit 101 which is used to store data needed for play of the game. The processing unit 101 is connected to a video encoder 103 which takes a digital image in video memory and converts it to a video signal which can be output to an output device (e.g., NTSC, PAL, VGA, SVGA, DVI, S-Video, component, composite, or other standard or proprietary format).

The video encoder 103 transmits the video signal to a splitter 105 which splits the video signal into a first signal and a second signal. A first signal is output to an output device 106, such as an LCD display, touch screen display, etc. The second signal is transmitted to a video signal analyzer 107. The splitter 105 and the video signal analyzer 107 can exist inside the physical EGD or can exist externally to the EGD as an independent, or separate unit. FIG. 1 shows them all internal to the EGD for simplicity.

The video signal analyzer 107 serves to analyze the second signal, which is identical to the original video signal. (but not interfering with output of the original video signal sent the output device 106). The analysis comprises constructing a block of memory to mimic what the video memory used by the video encoder to generate the video signal looks like. Then, this block of memory is analyzed in order to determine actions taking place in the game and also by the player. For example, character recognition can be used to identify each card dealt to the player. Replacement cards can also be detected, and other cues from the block of memory can be used (such as a "GAME OVER") indicator to note when the game has been completed. From these images, the video signal analyzer can determine which cards the player was dealt, which cards the player decided to hold or discard, and what the replacement cards were. Such "game play information" can then be transmitted to a casino server 108 which can store the information in a database in a record tagged to the current player. The current player can be identified by a loyalty card used by the current player inserted into a loyalty card reader (not pictured). The processing unit 101 can also be in communication with the casino server 108 so that the processing unit 101 can transmit other information, such as the bet amount, win or loss result, etc.

Thus, while the processing unit 101 transmits information to the casino server 108 so that the casino server 108 knows how many credits the current player has, the video signal analyzer 107 can also transmit information to the casino server 108 (or another casino database) so that more detailed game play data can be extracted and stored by the casino.

Figure 2:
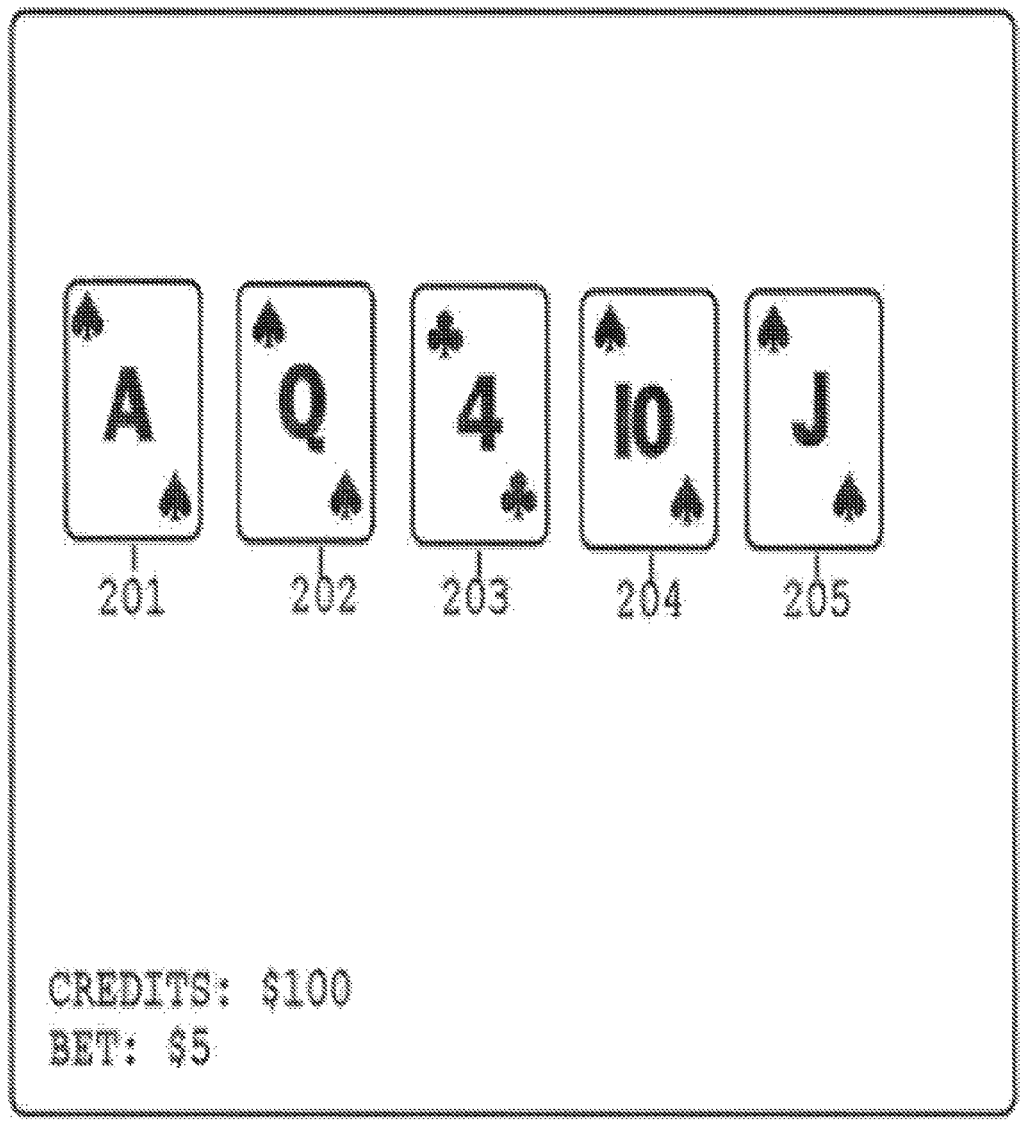
FIG. 2 is a front elevation view of a first stage of a video poker game.

FIG. 2 is an output of a first stage of a video poker game. A player places a wager by inserting cash, indicating to the machine how much the player wishes to bet, and presses a "deal" button. Five cards are dealt to a player. The player can indicate which cards to hold (for example by touching the cards on a touch screen display), and then press a "draw" button (either on the touch screen display or a physical draw button), whereby all of the cards that are not selected to be held are replaced.

A sample payout table is illustrated in Table I below.

TABLE I

| HAND | PAYS |
| --- | --- |
| Royal flush | 800 |
| Straight flush | 50 |
| Four of a kind | 25 |
| Full house | 9 |
| Flush | 6 |
| Straight | 4 |
| Three of a kind | 3 |
| Two pair | 2 |
| Pair | 1 |

Table I shows various winning hands and their payouts per coin bet. For each five card hand dealt to a player, there is a proper way for the player to select which cards to hold and discard in order to maximize the player's winnings.

In the example in FIG. 2, the player is dealt an ace of spades 201, a queen of spades 202, a four of clubs 203, a ten of spades 204, and a jack of spades 205. Note that the player is one card away from achieving a royal flush. Thus, the player would be playing optimally by holding all of the cards but for the four of clubs 203 in the hope of drawing a king of spades to make a royal flush. If the player decides to take any other action then the player would not be playing optimally. For example, if the player holds the ace of spades, the queen of spades, and the jack of spades, then this would have an expected return of much less than if the player played properly.

In the long run, a casino can determine a player's actual expected win (the amount this player would be expected to win based on their skill level) by computing total win/total bet. In other words, if the player won (was paid out) $90 and bet $100 (to earn the $90 payout), then the player's theoretical win is 90%. However, since video poker has a high variance, a very large number of hands would have to be played by the player in order for the casino to determine the player's true theoretical. This is because the player can play poorly but still be lucky and win money. A better way to determine a player's theoretical win is to determine the skill level of each player without regard to how much the player has actually won or lost. This is because the cards the player will draw are actually beyond the player's control, but the strategy the player chooses is nevertheless under the player's control.

The player's goal is to win the most money by achieving a high ranking hand. Video poker has a definite player strategy wherein a player should maximize the win of his hand by playing the proper strategy. Optimal strategy is a video poker strategy wherein the player plays perfectly in all situations.

Figure 3:
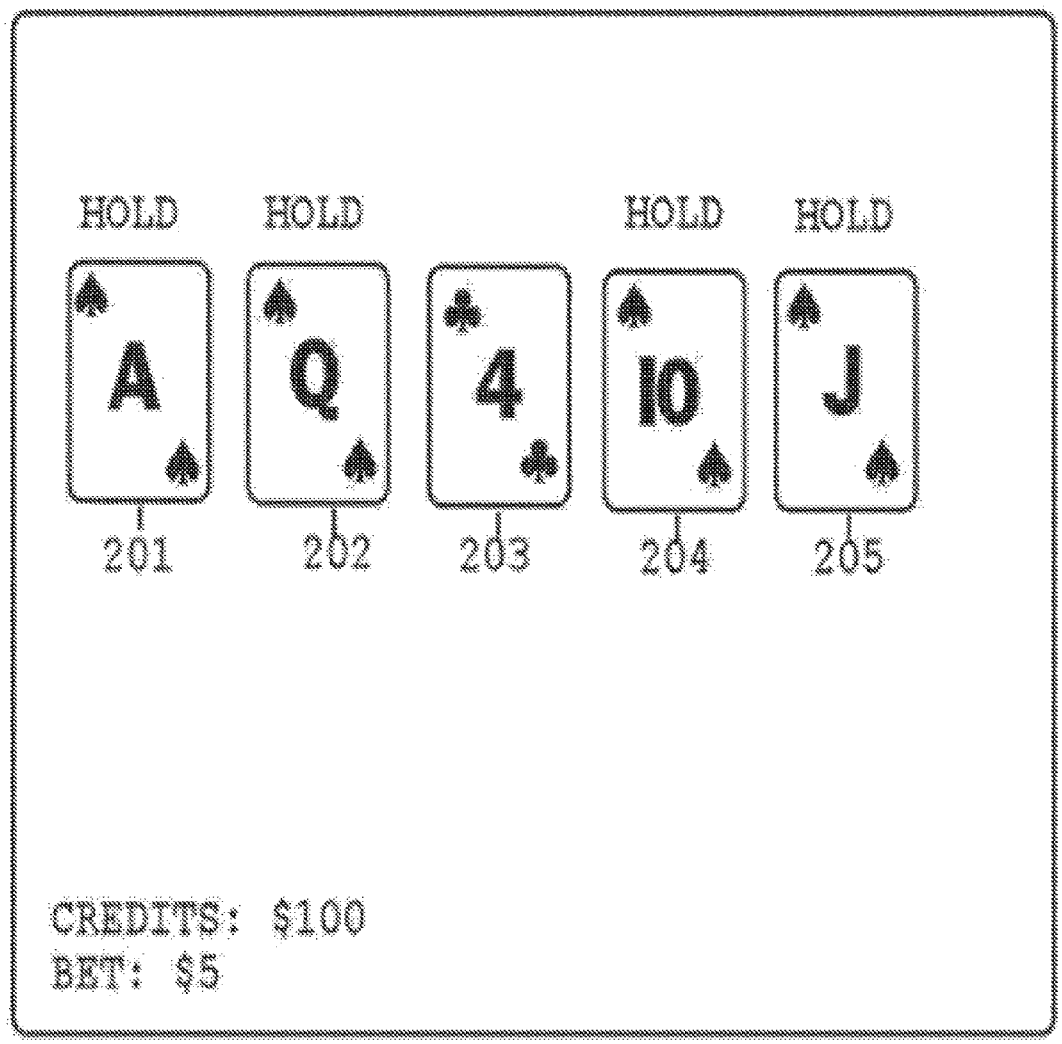
FIG. 3 is a front elevation view of a second stage of a video poker game.

FIG. 3 is an output of a second stage of a video poker game. In the second stage, the player has decided to hold the ace of spades 201, the queen of spades 202, the ten of spades 204, and the jack of spades 205. The output device displays an indicator for each card held (for example, "HOLD") so that the player knows which card he is holding.

When the player is satisfied with his selection of cards to hold and discard (cards not held are to be discarded), the player can press a "draw" button, which will replace the discarded cards with new cards randomly "dealt" from the deck.

In this example, the player has played properly by holding the four cards to a royal flush.

Figure 4:
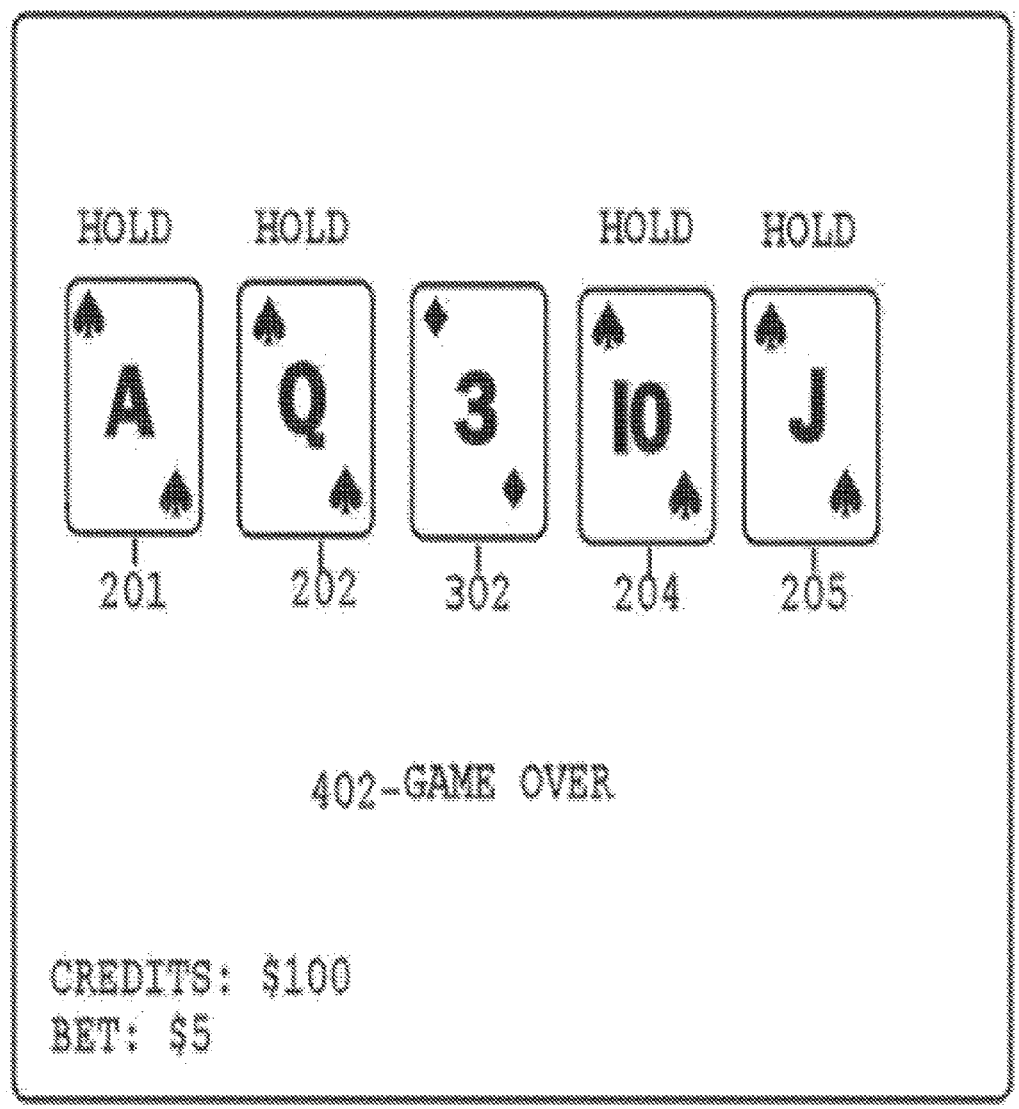
FIG. 4 is a front elevation view of a third stage of a video poker game.

FIG. 4 is an output of a third stage of a video poker game. The EGD replaces the four of clubs 203 with a new card, a three of diamonds 302. This is a losing hand (according to Table I) and the player loses his original wager. Even though the player played properly, the player of course cannot win each time, and in fact the probability of the player drawing into the royal flush was small (but the potential award large). A "GAME OVER" indicator 402 indicates that the game is over. The player can now decide to begin a brand new game by placing a new wager, or cash out by pressing a "cash out" button on the EGD.

By analyzing the video signals, the present invention can identify the following information from the display illustrated in FIGS. 2-4: The player was initially dealt an ace of spades 201, a queen of spades 202, a four of clubs 203, a ten of spades 204, and a jack of spades 205; that the player held the ace of spades 201, the queen of spades 202, the ten of spades 204, and the jack of spades 205, and that the replacement card was a three of diamonds 302. This information can be considered "game play information." Game play information is information regarding occurrences during the game and player actions (if any) which are used to determine a result.

The game play information can be analyzed locally by the video signal analyzer 107 (or another component), to determine the player error (if any), and then the error can be transmitted to the casino database. If the player does not play the hand properly, this can be considered an error. The casino database can store player information such as a total number of hands played by the player and an average error. This information can be used by the casino hosts when deciding to which players to offer incentives. A player of a lesser playing level might be more attractive to a casino than a player who plays perfect strategy.

The video signal analyzer 107 scans the video signal in real time in order to determine the game play information. It should also be appreciated that the present invention may operate in an environment in which the EGD does provide an output identifying all of the playing parameters or a more robust subset of the playing parameters. Thus, in some embodiments, the present invention may be required to rely totally on an analysis of the video content, while other embodiments may use a mixture of video content analysis coupled with information provided over the bus of the EGD (such as the SAS port) and in other embodiments, the invention may only utilize the data provided from the EGD machine data port.

Figure 5:
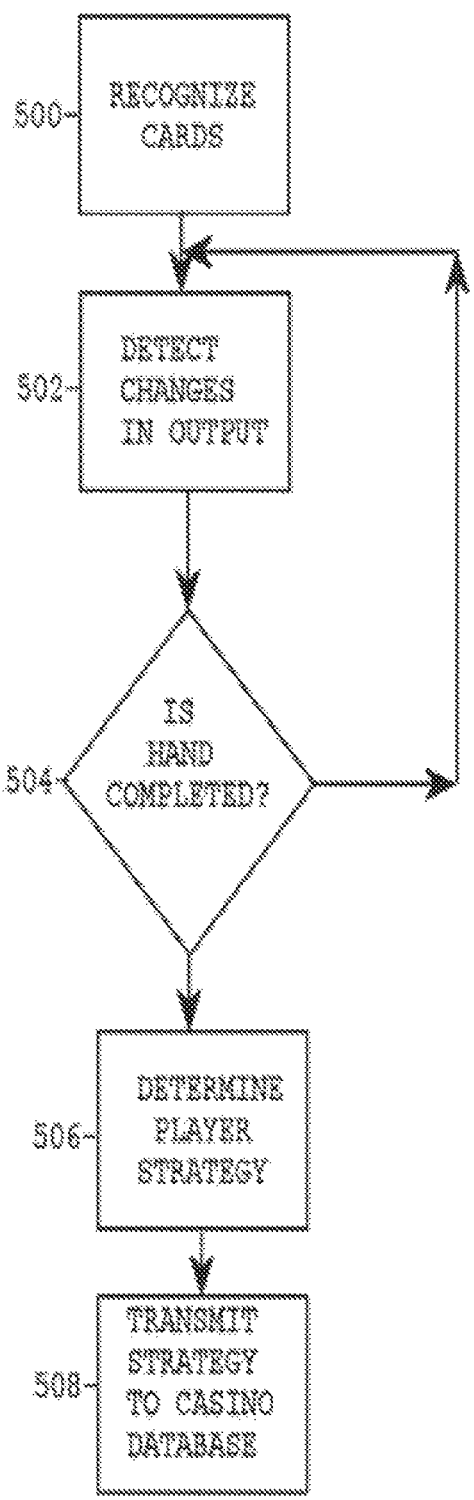
FIG. 5 is a flowchart of a process to decode and transmit video signals.

FIG. 5 is a flowchart of a process to decode and transmit video signals at the start of a new game.

Process 500 recognizes the cards dealt initially. This can be done by pre-storing the image files used for generating each of the cards and also storing where on the screen the cards are to be displayed. The video signal analyzer 107 can compare each image on the pre-stored locations and when an image file matches what is received from the video signal then it is known that this is a particular card. All five cards dealt can be determined in this manner Process 502 detects changes in the output. If the screen has changed, then some action must have occurred.

Process 504 determines whether the hand is completed. This can be performed by checking in a particular location on the output device (actually in a block of memory which is mimicking the video memory) for a game termination indicator, such as a "GAME OVER" indicator. If the hand is not yet completed (the game is not yet over), then flow can return to process 502 which continues monitoring and detecting changes in the video signal.

When process 504 determines that the hand is completed, then the overall process continues to process 506 which determine the player's indications of cards to hold. This can be done by detecting new cards that were not present when the initial cards were recognized in process 500. This can also be accomplished by identifying "hold" or "selected" indicators that identify the held cards. When a new card is detected (using the method described in process 500), then this can be assumed that it replaced a card "behind" it (and thus the player did not select this card to be held).

Thus, knowing the initially dealt cards and the replacement cards, it can be determined which cards the player selected to hold. Thus, knowing all of this information, in conjunction with the known paytable, the player's strategy (and the player's error, if any) can be computed.

Process 508 computes the error and transmits the error to the casino database 508. The optimal strategy for the hand dealt to the player can be determined and the way the player has played out the hand can be compared to the optimal strategy to determine if the player played properly or not.

The error can be computed by subtracting the theoretical win from the way the player actually played from the optimal return (the return if the player played the hand perfectly). Thus, for example, if optimal strategy results in an average return of 101% and the way the player played results in an average return of 98%, then the player has made an error which cost him 3%.

Referring now to FIGS. 2-4, the process illustrated in FIG. 5 will now be applied. In FIG. 2, process 500 would recognize all five cards. The five cards would be stored in a RAM.

Process 502 would continue receiving and analyzing the video signal to detect changes in output so those changes can be analyzed. When in FIG. 3, the player is indicated his selections to hold, process 502 would detect these changes and then process 504 would determine whether the hand is over. This can be determined by detecting a game termination condition such as the "GAME OVER" message or any other visual cue that the game is over. The hardware implementing the process illustrated in FIG. 5 would be programmed with knowledge of the video poker game in question so it would know the locations of elements such as cards and other visual cues or indicators so that the progress of the game can be followed. The process can continue to process 502 and continue detecting changes until process 504 determines that the game has ended.

When the player has completed his selection of cards to hold (in this case first, second, fourth, and fifth card), and the player presses draw, then the display illustrated in FIG. 4 results. Process 504 can determine that the "GAME OVER" indicator has appeared, thus indicating that the current game is over.

Once the game has ended, then process 506 can determine the player strategy. The final cards should still remain on the screen and the cards ranks can be discerned as the initial cards were. It would be recorded that only one card changed, the third card, from a four of clubs to a three of diamonds. Thus it can be concluded that the player held the first, second, fourth, and fifth card, playing properly.

The process can begin anew for each new game played by the player. After process 506, detection can still be active for when the player starts a new game. This can be accomplished, for example, when new cards are dealt, the "GAME OVER" indicator has been removed, or some change has been detected on the actual output. Once a new game been detected, the process in FIG. 5 can begin over again.

Thus, by analyzing the video signal, at least the following game play information can be determined: that the player's initial cards were: ace spades, queen spades, four clubs, ten spades, jack of spades; that the player held the ace spades, queen spades, ten spades, and jack spades; and that the four of clubs was replaced with a three of diamonds. Note that the latter piece of information may not even be necessary, as the player's error is not affected by the player's actual result. Whether the player hit the royal flush or not would not be indicative at all of whether the player had played properly or not in this instance.

A player who plays perfectly or close to perfectly (little or no error) is considered to have high skill, while the player who plays with a larger margin of error (from perfect strategy) is considered to have poor skill.

Figure 6A:
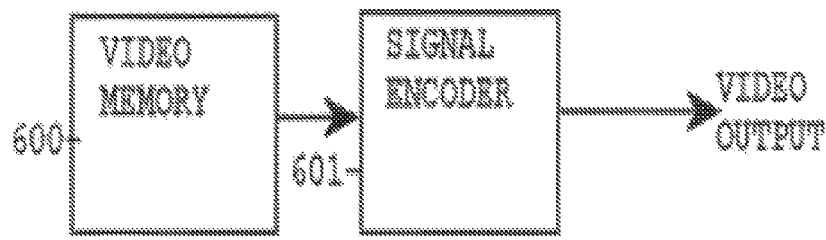
FIG. 6A is a schematic block diagram illustrating how a video signal is generated.

FIG. 6A is a system diagram illustrating how a video signal is generated. A video memory 601 is read by a signal encoder 601 which transforms the image in the video memory 600 into a video signal readable by an output device. The encoder is programmed specifically for a particular type of video signal.

Figure 6B:
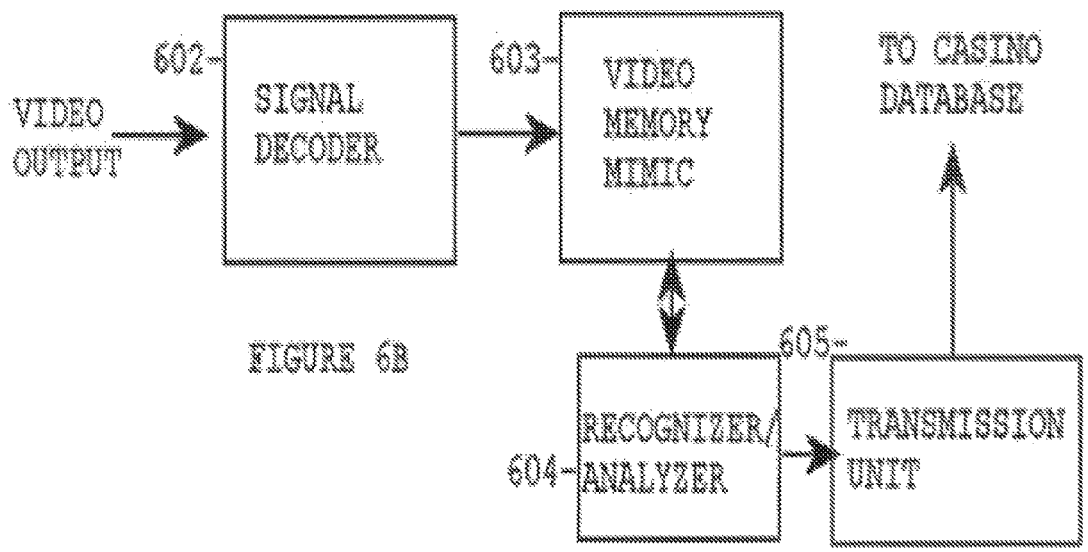
FIG. 6B is a schematic block diagram illustrating a possible structure of the video signal analyzer.

FIG. 6B is a system diagram illustrating a possible structure of the video signal analyzer. This can be considered the reverse of what takes place in FIG. 6A. A video output (such as the video output from FIG. 6A) is fed into a signal decoder 602. The signal decoder 602 can be considered the opposite of the signal encoder 601. The signal decoder 602 receives the video output signal and converts it into an image map or video memory mimic 603 (a block of RAM) which is memory that stores values that can be identical or correlated to what the video memory was that was used to create the video output signal in the first place. For example, if the video output signal is a digital signal, then each pixel of the digital signal can be mapped to a pixel in the video memory mimic 603 (for example using a pixel map).

Once the video memory mimic 603 is generated, then this can be analyzed using image recognition techniques. A recognizer/analyzer 604 recognizes images in the video memory mimic 603 can perform an analysis on what is recognized (for example, perform the process illustrated in FIG. 5).

A plurality of image maps can be stored so that the recognizer/analyzer 604 can retrieved the images maps and compare them to relevant portions of the video memory mimic 603. When a match is found, then the recognizer/analyzer 604 knows that a particular element is being displayed. As soon as the initial cards are dealt, the recognizer/analyzer 604 should recognize the card images and determine the card ranks (which are mapped to each card image) immediately. Then the recognizer/analyzer 604 can wait until the game is completed and then determine which (if any) cards were replaced, so the player's decision (strategy) can be determined It is noted that the examples and methods described in this document are just one example of how the invention can be implemented, but one of ordinary skill in the art could appreciate that video poker can be implemented in different fashions and that processes herein should be tailored to the particular version of video poker (or other game) being played.

Once data has been produced (for example, a skill rating of the player for a particular hand of video poker), the data can be transmitted to a transmission unit 605 which then transmits the data to a casino database. The data may be transmitted with some type of identifier identifying the current player.

In an embodiment of the present invention, player decisions on video poker machines in real time are used to determine true video poker house advantage and using the same to compute theoretical win for the purposes of complimentary qualification.

The invention thus utilizes actual player hold/discard decisions for individual poker hands to ascertain a more accurate theoretical win percentage for individual players. This method involves comparing actual player decisions to best or optimal strategy to derive a more accurate theoretical win expectation which can then be used to derive theoretical win and other related statistics. Players that play at a higher theoretical win expectation (a better player) may not be desirable players to the casino, while players that play at a lower theoretical win expectation (worse players) may be more desirable. The worse video poker players may receive marketing promotions (such as free or discounted room) in order that they visit the casino where they will hopefully lose money playing video poker.

One advantage of the present invention is that direct communication with a processing unit (such as processing unit 101) which is controlling the game is not needed (and such communication may not even be possible). Thus, if the casino wishes to know what a player's playing strategy is, then a video signal analyzer and related apparatuses can be implemented to produce game play information relating to the player's game (including the player's errors) can be implemented.

It is further noted that the methods described herein are not merely limited to video poker. The present invention can be applied to any other type of wagering game. For example, video blackjack can be processed similarly, so that a players skill at video blackjack can be determined. Even slot machine games can be analyzed so that each individual symbol can be determined and stored. While such slot machine games may not require any skill, it may still be helpful to the casino to track which symbols have appeared during the players play.

Another aspect of the present invention is the analysis of the video content to verify authenticity of the gaming software. For instance, in a video poker game, a watermark can be embedded in the playing cards. By reading the video content and examining the watermark, the authenticity of the software driving the display can be verified. Also, the watermark can be structured in such a manner that it greatly simplifies the ability to detect the video content. For instance, rather than having to analyze the entire video stream to ascertain the content of the video, the special embedded signals can be search for and detected.

It will be appreciated that the above described methods and embodiments may be varied in many ways, including, changing the order of steps, and the exact implementation used. The present invention has been described using detailed descriptions of embodiments thereof that are provided by way of example and are not intended to limit the scope of the invention. The described embodiments comprise different features and aspects, not all of which are required in all embodiments of the invention.

Some embodiments of the present invention utilize only some of the features or aspects or possible combinations of thereof. Variations of embodiments of the present invention that are described and embodiments of the present invention comprising different combinations of features noted in the described embodiments will occur to persons of the art.

The invention is claimed as follows:

1. An apparatus comprising:
at least one processor; and
at least one memory device which stores a plurality of instructions which, when executed by the at least one processor, cause the at least one processor to:
determine, based on a video signal transmitted to a display device of an electronic gaming device, skill data associated with at least one quantifiable skill input made by a player for a play of a game displayed by the display device of the electronic gaming device, wherein an outcome determined for the play of the game is based, at least in part, on the at least one quantifiable skill input, and
independent of the outcome determined for the play of the game and independent of any award associated with the determined outcome, communicate the determined skill data to a server which determines an incentive level for the player, said determination being based on the at least one quantifiable skill input.

2. The apparatus of claim 1, wherein the server determines the incentive level for the player based on the at least one quantifiable skill input relative to at least one optimal skill input.

3. The apparatus of claim 1, wherein the server determines the incentive level for the player at least partially based on a previously determined incentive level for the player.

4. The apparatus of claim 1, wherein the game is a partial skill-based game.

5. The apparatus of claim 1, wherein the electronic gaming device includes a plurality of input devices including an acceptor and a cashout device and when executed by at least one electronic gaming device processor, a plurality of electronic gaming device instructions cause the at least one electronic gaming device processor to, responsive to a physical item being received via the acceptor, establish a credit balance based, at least in part, on a monetary value associated with the received physical item, and responsive to a cashout input being received via the cashout device, cause an initiation of any payout associated with the credit balance.

6. A gaming system server comprising:
at least one processor; and
at least one memory device which stores a plurality of instructions which, when executed by the at least one processor, cause the at least one processor to:
receive skill data from an apparatus which monitors video signals transmitted to a display device of an electronic gaming device, said received skill data associated with at least one quantifiable skill input made by a player for a play of a game displayed by the display device of the electronic gaming device, wherein an outcome determined for the play of the game is based, at least in part, on the at least one quantifiable skill input, and
independent of the outcome determined for the play of the game and independent of any award associated with the determined outcome, determine an incentive level for the player, said determination being based on the at least one quantifiable skill input.

7. The gaming system server of claim 6, wherein when executed by the at least one processor, said plurality of instructions cause the at least one processor to determine the incentive level for the player based on the at least one quantifiable skill input relative to at least one optimal skill input.

8. The gaming system server of claim 6, wherein when executed by the at least one processor, said plurality of instructions cause the at least one processor to determine the incentive level for the player at least partially based on a previously determined incentive level for the player.

9. The gaming system server of claim 6, wherein at least one incentive is provided to the player based on the determined incentive level for the player.

10. The gaming system server of claim 6, wherein the game is a partial skill-based game.

11. The gaming system server of claim 6, wherein a credit balance of the electronic gaming device is increasable based on any determined award associated with the determined outcome, said credit balance being increasable via an acceptor of a physical item associated with a monetary value, and said credit balance being decreasable via a cashout device configured to receive an input to cause an initiation of a payout associated with the credit balance.

12. A method of operating an apparatus, said method comprising:
determining, by at least one processor and based on a video signal transmitted to a display device of an electronic gaming device, skill data associated with at least one quantifiable skill input made by a player for a play of a game displayed by the display device of the electronic gaming device, wherein an outcome determined for the play of the game is based, at least in part, on the at least one quantifiable skill input, and
independent of the outcome determined for the play of the game and independent of any award associated with the determined outcome, communicating, by the at least one processor, the determined skill data to a server which determines an incentive level for the player, said determination being based on the at least one quantifiable skill input.

13. The method of claim 12, wherein the server determines the incentive level for the player based on the at least one quantifiable skill input relative to at least one optimal skill input.

14. The method of claim 12, wherein the server determines the incentive level for the player at least partially based on a previously determined incentive level for the player.

15. The method of claim 12, wherein the game is a partial skill-based game.

16. The method of claim 12, wherein a credit balance of the electronic gaming device is increasable based on any determined award associated with the determined outcome, said credit balance being increasable via an acceptor of a physical item associated with a monetary value, and said credit balance being decreasable via a cashout device configured to receive an input to cause an initiation of a payout associated with the credit balance.

* * * * *